Patented Jan. 5, 1932

1,839,894

UNITED STATES PATENT OFFICE

ELOI RICARD AND HENRI MARTIN GUINOT, OF MELLE, FRANCE, ASSIGNORS, BY MESNE ASSIGNMENTS, TO U. S. INDUSTRIAL ALCOHOL CO., OF NEW YORK, N. Y., A CORPORATION OF WEST VIRGINIA

CONTINUOUS PROCESS FOR THE MANUFACTURE OF ACETIC ACID IN THE ANHYDROUS STATE FROM ITS AQUEOUS SOLUTIONS

Application filed December 31, 1927, Serial No. 243,973, and in France September 10, 1927.

It is an observed fact that acetic acid may be extracted from its aqueous solutions by agitation with volatile solvents which are hardly soluble in water, such as sulphuric ether, ethyl acetate or the like. The volatile solvent employed is then evaporated to remove it from the mixture and to obtain a residue of acetic acid in a more or less concentrated state according to the operating method employed. However, this process offers the disadvantage consisting in the fact that it requires the evaporation of large quantities of the solvent in use.

It has been further proposed to treat the aqueous acetic solutions by solvents having a high boiling point; the acetic acid is thus dissolved in the layer of solvent, from which it is then separated by distillation, the acid being distilled over in the first place. The temperature of 150 degrees C. is given as the minimum boiling point to be adopted for the solvent, so that the acid can be removed with facility, but as a rule the solvents employed have a much higher boiling point. For this reason the said method is defective inasmuch as it requires a heating at high temperatures, or the use of a vacuum, and the resulting acid is not in a very pure state. Furthermore, the extracting power of the heavy solvents for acetic acid is generally very small, so that this method offers less interest.

The present invention has for its object the recovery of acetic acid by the use of solvents having a mean boiling point, i. e. whose boiling point is above that of acetic acid but below 150° C.

Hitherto this class of solvents has not been employed in manufacture, in spite of the sufficient extracting power which these solvents usually possess, this being due to the defective results obtained when the acid is to be removed. After the extraction stage, it is desired to remove the acetic acid from its solvent by distillation, but the solvent will be distilled at the same time as the acid, even when the distillation is completed by a thorough rectification with an abundant backflow, hence requiring the use of a large amount of steam.

We have observed that the difficulties in the separation of the acid from its solvent are due almost entirely to the presence of a small quantity of water in the mixture (0.5 to .3 per cent) which acts during the distillation to form with the solvent a mixture having a minimum boiling point. By eliminating this small quantity of water so as to operate with an anhydrous mixture, the acid can be readily removed from the solvent on the sole condition that the solvent be chosen among the liquids which will not give an azeotropic mixture with acetic acid.

Mean boiling point solvents which will not form an azeotropic mixture with the anhydrous acetic acid include amyl acetate, mesityl oxid, dibutylether, butyl acetate, amyl alcohol, butyrone, etc. These are given merely as examples, since there are numerous others.

According to the present invention, we remove this water by the use of an auxiliary entraining liquid which is insoluble or but little soluble in water and is sufficiently volatile in order that the azeotropic mixture which it forms with the water will act as a first distilled product with reference to the mixture having a minimum boiling point formed by the water and the solvent used for the extraction. The entraining liquid may be added to the solvent before the extraction if it has a favorable action on the solvent, or if not, after the extraction.

Examples of auxiliary entraining liquids which may be employed, and the boiling points of the azeotrophic mixtures which they form with water, include ethyl acetate (70.5° C.), propyl acetate (82.4° C.), isopropyl acetate (75°–76° C.), isobutyl acetate (87.4° C.), isobutyl formate (80.4° C.), ethyl butyrate (88° C.), dipropylether (90° C.), di-isopropylether (62° C.), methyl-isopropylketone (79° C.), di-ethylketone (82.9° C.), and methyl-propylketone (82.9° C.).

We may effect the dehydration by means of the auxiliary entraining body by employing the technique already known for the dehydration of acetic acid and ordinary alcohol by the azeotropic methods. After the mixture of acid and solvent is dehydrated, the acid is removed in a distilling chamber known per se. The acid comes over in the first place in the anhydrous state, and the solvent is removed at the bottom of the apparatus, and may be used again for the extraction.

The solvent having the mean boiling point, as well as the auxiliary entraining liquid which is employed may be either pure products or mixtures.

The said process is applicable not only to pure aqueous solutions of acetic acid, but also to solutions containing inorganic salts or even certain organic substances. It is simply necessary to choose properly the solvent having the mean boiling point used for the extraction. In this manner we may readily treat the acetic waters resulting from the manufacture of the acetates of cellulose. These waters contain in solution various salts and cellulose matter. During the extraction, this latter is precipitated as soon as the acid is no longer present in sufficient quantity, but it will not dissolve in the extracting agent, and collects at the surface of separation between the exhausted aqueous solution and the solvent. It may then be eliminated with facility by suitable mechanical means.

Example 1

Figure 1:
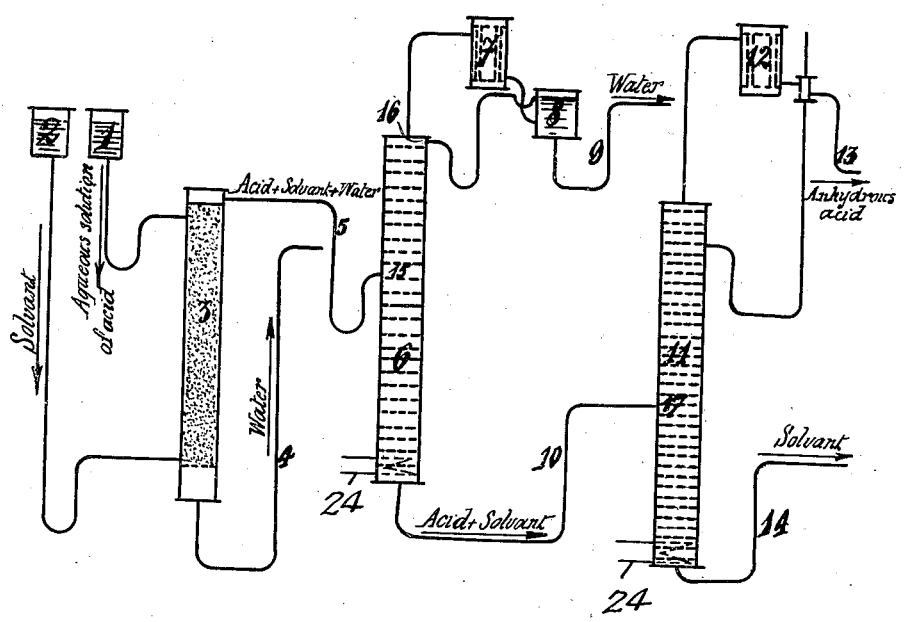
Fig. 1 is a diagrammatic representation of the plant used to carry out the process.

The treatment is applied to a 30 per cent solution of acetic acid, in the plant represented diagrammatically in Fig. 1 of the appended drawings.

The acid acetic which is contained in the recipient 1, and amyl acetate boiling at 138 to 140° C. which is employed as a mean solvent and is contained in the recipient 2, are circulated on the counter-flow principle in the extracting apparatus 3. The solution from which the acid is removed will issue through the pipe 4; the mixture of acid and amyl acetate, containing a small amount of water, will issue through the pipe 5 and will enter the dehydration apparatus 6 provided with a steam coil 24 for surface heating and comprising its accessories, chiefly the condenser 7 and the decanting apparatus 8. The dehydration takes place by employing ethyl acetate, for example, as the entraining body; it forms with water an azeotropic mixture which boils at 70.5° C., this being condensed in the cooling device 7 and separating into two liquid layers in the decanting apparatus 8. The upper layer containing the ethyl acetate is sent at 16 into the top of the apparatus 6. The water issues through the pipe 9; the anhydrous mixture of acid and solvent is discharged from the apparatus 6 through the pipe 10 and enters, at 17, the distilling apparatus of the ordinary type 11, provided with a steam coil 24 for surface heating and employing the condenser 12. The anhydrous acid flows out through the pipe 13, and the restored solvent through the pipe 14. This latter is used again indefinitely, after it has been cooled, preferably by the cold liquid supplying the apparatus 6.

We much reduce the amount of steam used in the apparatus 6 by heating it by the use of the heat available in the acetic acid vapor escaping from the apparatus 11. This offers a great economy, and chiefly when very dilute acids are treated.

Figure 2:
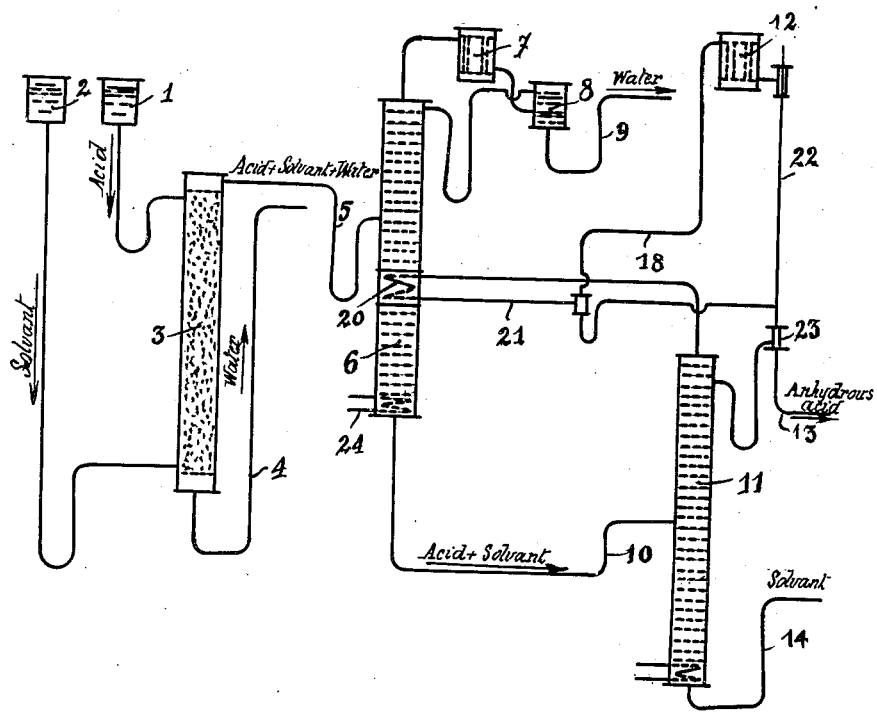
Fig. 2 represents a modification.

The following arrangement, shown in the diagrammatic Figure 2, may be adopted.

Example 2

The acetic acid vapor issuing from the top of the apparatus 11, instead of circulating directly into the condenser 12, passes into a surface heating device 20 placed in the apparatus 6. The condensed acetic acid flows out through the pipe 21 and into the recipient 23 which serves for the back flow and the extraction; the uncondensed vapors of acetic acid rise through the pipe 18 to the condenser 12 whose condensed liquid also returns through pipe 22 to the recipient 23.

If the apparatus 6 is not sufficiently heated by the acetic acid vapors, the additional heating is provided at the bottom of the apparatus 6 in the ordinary manner by the use of steam in the worm pipe 24.

Certain aqueous solutions of acetic acid contain organic or inorganic impurities whose presence offers difficulty to the systematic removal by the mean solvents.

Figure 3:
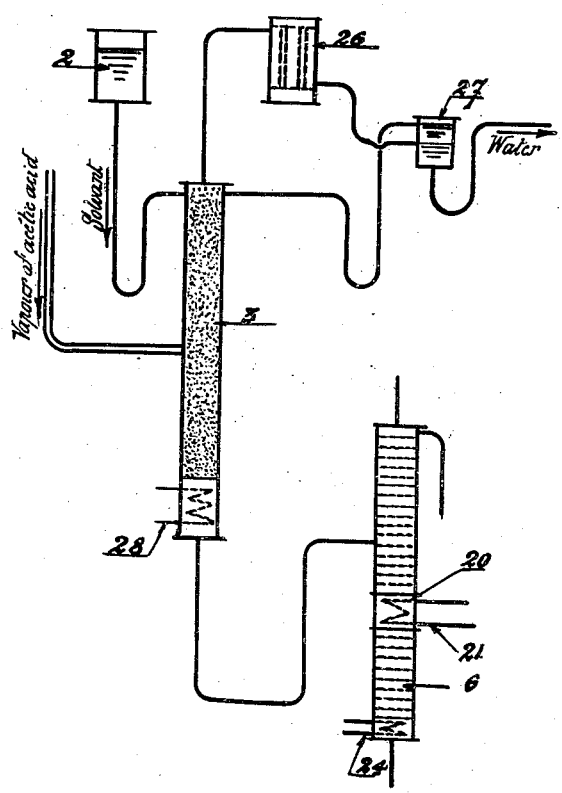
Fig. 3 shows a part of the apparatus used in another modification of the process.

This will for instance be the case with the dilute solutions of acetic acid obtained by the fermentation of cellulose, which contain mucilaginous substances acting against the decantation in the apparatus 3. To obviate this defect, the systematic removal is effected by the mean solvents by acting upon the vapors instead of upon the liquids, and herein we employ the apparatus shown in Fig. 3.

The acid vapor containing a large amount of water vapor is sent into the middle part of the distilling apparatus 3 which is charged in the first place with the mean solvent. This latter is brought to the boiling point and it rises with the water vapor to the top of the apparatus, producing a binary azeotropic mixture of water and mean solvent. This latter settles in the decanting device 27, after condensation in the condenser 26. The bottom layer of liquid in the decanting apparatus is rejected, and the upper layer of mean solvent is constantly returned to the top of the extracting apparatus 3. As to the acetic acid vapors, these are dissolved in the mean solvent which constantly descends from the top of the apparatus, and are thus drained to the bottom. At this part, due to a small extra heating, at 28, there is drawn off at the bottom of the apparatus only a mixture of acid, mean solvent and a small amount of water. This mixture enters the apparatus 6, and we thus return to the general case, as above specified.

The used solvent issues from the bottom of apparatus 11, which is to be understood as being connected with apparatus 6 as shown in the other views, and is returned to the tank 2, as in the general case.

The present method, as well as the methods above disclosed, may be applied either at atmospheric pressure or at pressures above or below atmospheric pressure.

What we claim is:—

1. A process for the removal of acetic acid, in the anhydrous state, from its aqueous solutions, in which the aqueous solution of acetic acid is treated with a solvent for acetic acid consisting of a liquid whose boiling point exceeds that of acetic acid but is below 150 degrees C. and which will not form an azeotropic mixture with the anhydrous acid, then distilling the resulting mixture after the addition of an auxiliary entraining liquid so selected as to produce with water a mixture having a low minimum boiling point, in such manner as to remove the water, and thereafter distilling the dehydrated mixture of acid and solvent to remove the acid from the solvent.

2. In a process for the recovery of acetic acid from its aqueous solutions, wherein the aqueous solution of acetic acid is treated with a solvent for acetic acid consisting of a liquid whose boiling point exceeds that of acetic acid but is below 150 degrees C. and which will not form an azeotropic mixture with the anhydrous acid, the step which comprises dehydrating the resulting mixture by distilling the same with the addition of an auxiliary entraining liquid so selected as to produce with water a mixture having a low minimum boiling point, prior to removal of the acetic acid from the solvent by distillation.

3. A process for the dehydration of an aqueous solution of acetic acid containing foreign bodies in solution in which there is added to the solution a solvent for acetic acid, said solvent having a boiling point which exceeds that of acetic acid but is below 150 degrees C. and will not form an azeotropic mixture with the anhydrous acid, then eliminating the said foreign bodies which accumulate at the surface of separation between the solution undissolved by the solvent and the solution dissolved by the said solvent, then distilling the resulting mixture after the addition of an auxiliary entraining liquid so selected as to produce with water a mixture having a low minimum boiling point, in such manner as to remove the water, and thereafter distilling the dehydrated mixture of acid and solvent to remove the acid from the solvent.

4. A process for the dehydration of an aqueous solution of acetic acid containing in solution organic substances such as the derivatives of cellulose in which there is added to the solution a solvent for acetic acid, said solvent having a boiling point which exceeds that of acetic acid but is below 150 degrees C. and will not form an azeotropic mixture with the anhydrous acid, then eliminating the said cellulose products which accumulate at the surface of separation between the solution undissolved by the solvent and the solution dissolved by the said solvent, then distilling the resulting mixture after the addition of an auxiliary entraining liquid so selected as to produce with water a mixture having a low minimum boiling point, in such manner as to remove the water, and thereafter distilling the dehydrated mixture of acid and solvent to remove the acid from the solvent.

5. A process for the dehydration of aqueous solutions of acetic acid, in which the solution of acetic acid is treated with a solvent whose boiling point exceeds that of acetic acid but is below 150 degrees C. and which will not form an azeotropic mixture with the anhydrous acid, the resulting mixture of acetic acid, solvent, and water being then distilled with an auxiliary entraining liquid which produces with water a mixture having a low minimum boiling point in such manner as to remove the water, then distilling the acid and the remaining solvent in such manner as to separate the anhydrous acid from the said solvent, the distilled vapor of the anhydrous acetic acid being sent into the zone in which is effected the first azeotropic distillation of the mixture of acid, solvent, water, and the said entraining body, whereby the said zone will be wholly or partially heated by the acetic acid vapor issuing from the second distillation.

6. A process for the dehydration of aqueous solutions of acetic acid, in which the said solutions are evaporated and the resulting vapors of acetic acid and water are circulated into a zone containing a solvent for acetic acid whose boiling point exceeds that of acetic acid but is below 150 degrees C. and which will not form an azeotropic mixture with the anhydrous acid, the azeotropic mixture formed by said solvent and the water being removed at the top of said zone, and the mixture of acetic acid, solvent, and a small quantity of water being removed at the bottom of said zone, then distilling the resulting mixture after the addition of an auxiliary entraining liquid so selected as to produce with water a mixture having a low minimum boiling point, in such manner as to remove the water, and thereafter distilling the dehydrated mixture of acid and solvent to remove the acid from the solvent.

In testimony whereof we have signed this specification.

ELOI RICARD.
HENRI MARTIN GUINOT.